United States Patent [19]

Pioli

[11] Patent Number: 4,531,022
[45] Date of Patent: Jul. 23, 1985

[54] DEVICE FOR GENERATING BINARY DIGIT PSEUDO-RANDOM SEQUENCES

[75] Inventor: Maurizio Pioli, Rome, Italy

[73] Assignee: International Standard Electric Corporation, New York, N.Y.

[21] Appl. No.: 457,803

[22] Filed: Jan. 13, 1983

[51] Int. Cl.³ .............................................. H04K 3/00
[52] U.S. Cl. .................................... 178/22.19; 377/72
[58] Field of Search ................. 377/47, 72, 73, 81, 377/116, 119; 178/22.19

[56] References Cited

U.S. PATENT DOCUMENTS

| | | | |
|---|---|---|---|
| 3,673,501 | 6/1972 | Zeph | 377/72 |
| 3,691,472 | 9/1972 | Bohman | 377/72 |
| 3,818,242 | 6/1974 | Freedman | 377/72 |
| 4,034,156 | 7/1977 | Willmore | 178/22.19 |
| 4,244,027 | 1/1981 | Shai | 377/47 |
| 4,264,781 | 4/1981 | Oosterbaan et al. | 178/22.19 |
| 4,296,384 | 10/1981 | Mishima | 377/71 |
| 4,304,962 | 12/1981 | Fracassi et al. | 178/22.19 |
| 4,348,597 | 9/1982 | Weber | 377/72 |
| 4,409,434 | 10/1983 | Basset et al. | 178/22.19 |
| 4,450,321 | 5/1984 | Quigley et al. | 178/22.19 |

FOREIGN PATENT DOCUMENTS

| | | | |
|---|---|---|---|
| 3006717 | 8/1981 | Fed. Rep. of Germany | 178/22.19 |
| 1517781 | 7/1978 | United Kingdom | 377/72 |

Primary Examiner—Salvatore Cangialosi
Assistant Examiner—Aaron J. Lewis
Attorney, Agent, or Firm—John T. O'Halloran; Peter R. Ruzek

[57] ABSTRACT

The device is associated with a logic apparatus thereto four lines are coupled for transmitting logic data having a predetermined frequency and supplying at the output thereof a multiplexed signal having a frequency which is four times the mentioned frequency and responsive to the control of the subject device which comprises a binary digit pseudo-random sequence source and four Exclusive-OR logic circuits coupling said source to said apparatus in such a way as to define for said multiplexed signal a pseudo-random sequence having a period $2^7-1$, as the tributary data is $T1=T2=T3=T4="\emptyset"$.

1 Claim, 5 Drawing Figures

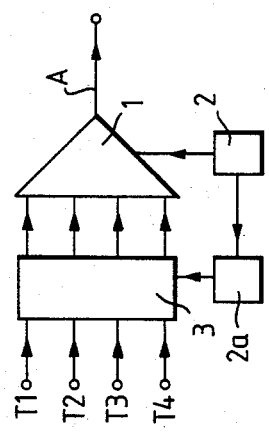

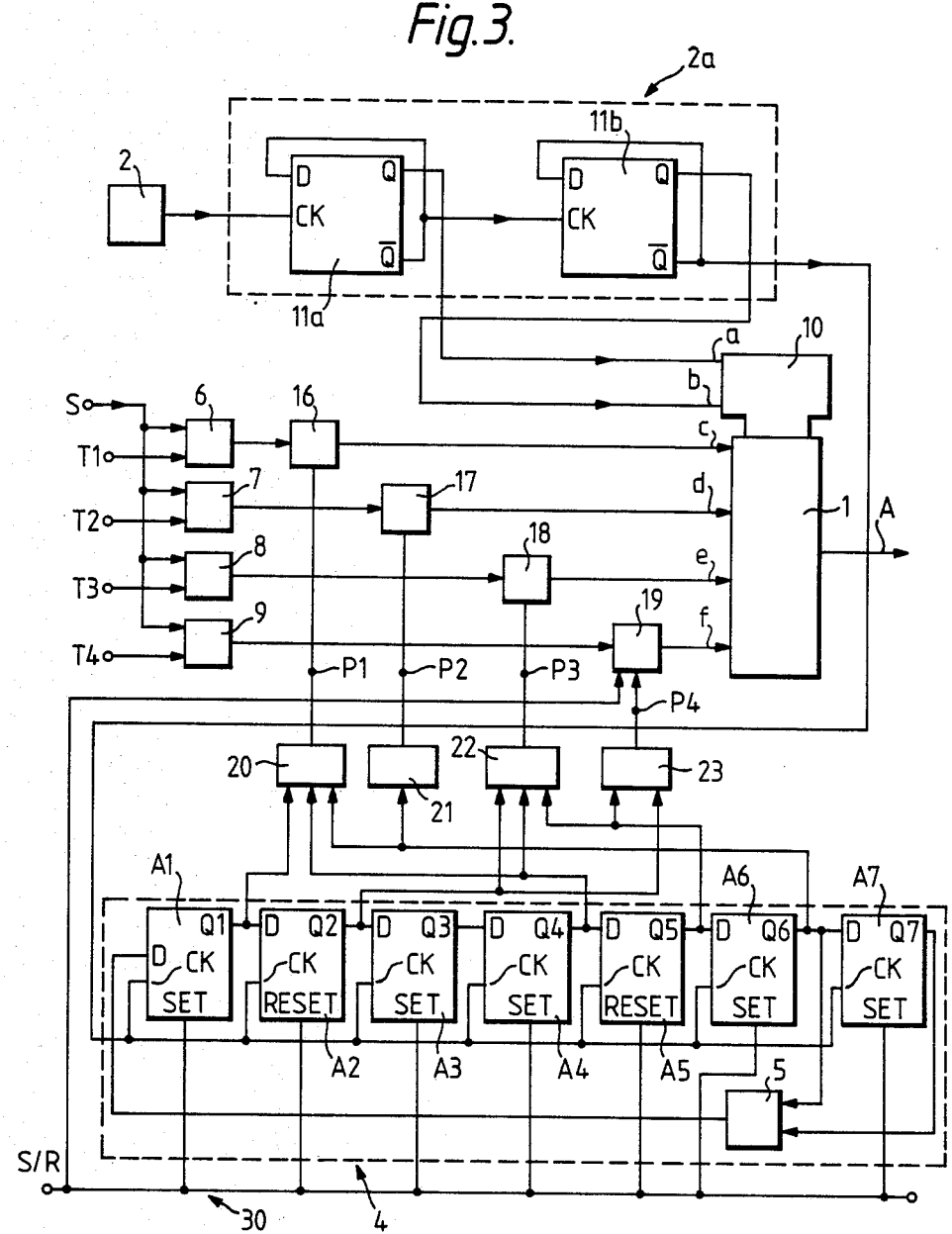

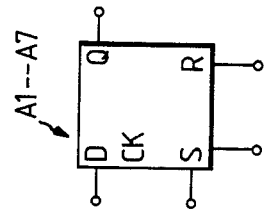
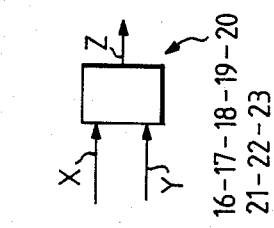
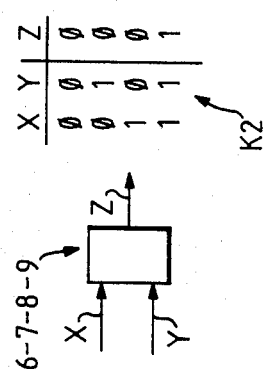
Fig.4.

DEVICE FOR GENERATING BINARY DIGIT PSEUDO-RANDOM SEQUENCES

BACKGROUND OF THE INVENTION

There is already known a device called "Parallel Selfsynchronizing Scrambler" (indicated at 3 in FIG. 1) at the inputs thereof there are coupled four lines thereon there is respectively transmitted tributary data T1,T2,T3,T4 (at a frequency of 141 Mbits/sec ) and the four outputs thereof are coupled to a multiplexer 1 which is driven at 565 MHz by an oscillator or clock 2 (therewith a frequency divider is associated, indicated at 2a and provided for driving at 141 MHz the device 3); thus at the output A of the multiplexer 1 the data T1,T2,T3,T4 are effectively scrambled and are transmitted on the transmission line at a frequency of 565 M bits/sec.

The above mentioned devices 3 are however affected by known drawbacks, which can be resumed as follows:
(1) the line errors are three times greater
(2) there is necessary to provide additional logic control networks for reducing the possibility of having long recursive consecutive zero sequences.

In order to overcome the above mentioned drawbacks of the item (1) and (2) there is used the well known Reset Scrambler (which for example is recommended by the German and French Administrations) indicated in block form in FIG. 2.

In FIG. 2a the real scrambler, schematically indicated at 4, is actually a pseudo-random sequence source; said source or generator consists of seven like sequential blocks (or flip-flops) A1,A2,A3,A4,A5,A6,A7 at each thereof there have been indicated at D,Q,CK,PR respectively the input, output, clock input (as derived from the divider 2a supplying a clock pulse sequence having a frequency of about 141 MHz) and the preset input.

The outputs Q1,Q2,Q3,Q4,Q5,Q6 are directly coupled to the D inputs of the blocks A2,A3,A4,A5,A6,A7 respectively, while the outputs Q6,Q7 of the blocks A6,A7 are coupled to an Exclusive-OR 5, the output thereof is coupled to the D input of the block A1.

The tributary data T1,T2,T3,T4 are sent to corresponding AND logic circuits 6,7,8,9, jointly to the synchronization signal S (see FIG. 2a).

The outputs of the mentioned AND circuits are coupled to corresponding Exclusive-OR logic circuits 16,17,18,19 thereto there are respectively coupled the outputs Q2,Q1,Q7,Q5 of the blocks A2,A1,A7,A5. The outputs c,d,e,f of the circuits 16,17,18,19 are coupled to corresponding inputs of the multiplexer 1.

More specifically said multiplexer 1 provides at the output A thereof the data which are present at the inputs thereof, under the control of a logic block 10 and according to the truth table H1 of FIG. 2b; it should be noted that the input "a" of the logic block 10 is coupled to the output Q of the first of the two flip-flops 11a forming the frequency divider 2a, the remaining input b of that same logic block 10 being coupled to the output of an AND circuit 12 to the two inputs thereof there are respectively sent the synchronization signal S and the signal derived from the Q output of the second flip-flop 11b of the divider 2a.

The operation of the above illustrated circuitry of FIG. 2a may be easily desumed from the truth table of FIG. 2b.

More specifically the first column of said table indicates the elementary times 7 scanned by the clock signals supplied by the divider 2a, the columns from the second to the eighth indicate the logic levels of the mentioned outputs Q1,Q2,Q3,Q4,Q5,Q6,Q7, the ninth column indicates the logic levels of the present signal PR, the tenth column indicates the logic levels of the synchronization signal S, the columns from the eleventh to the fourteenth illustrate the signals G1,G2,G3,G4 of the source 4 used for the scrambling operation, and, finally columns from fifteenth to eighteenth indicate the logic levels of the signals sequentially sent in that order (that is from the fifteenth to the eighteenth column) at the output A of the multiplexer 1.

At the elementary time zero (first column) the present signal is ∅ and the signal S is also ∅: the outputs of the blocks A1 . . . A7 are at a 1 logic level; in other words at the input A there are present the logic levels of the inputs c,d as it may be desumed from table H1.

At the second and third clock pulses (with the preset signal at the logic level 1), the signal S is again ∅, thereby to the input A there are sequentially sent the logic levels present at the inputs c,d: thus, by three clock pulses, at the output A there is formed the frame aligning word F (FIG. 2b, table H2) which, as it is known, is: "1 1 1 1 1 ∅ 1 ∅ ∅ ∅ ∅ ".

At the fourth clock pulse, the signal S is "1", thereby all the four outputs Q2,Q1,Q7,Q5 of the blocks A2,A1,A7,A5 are used for carrying out the scrambling of the tributary signals T1,T2,T3,T4 (to this end see the contents of the fourth and following rows from the fifteenth to the eighteenth columns of table H2).

The device illustrated in FIG. 2a, in addition to overcoming the mentioned drawbacks of items (1) and (2) affords the great advantage that as it is reset it generates the mentioned hard copy frame aligning word F.

On the other hand, said Reset Scrambler is affected by a great drawback. In fact in the case therein the signals T1,T2,T3,T4 are of the periodic type, in particular T1=T2=T3=T4=∅, the multiplexed signal (at the output A) does not represent a pseudo-random succession of period $2^7-1$, but a sequence with a rather approximative randomness, which is greatly objectionable, since in those cases it would be necessary to have sequences as random as possible.

SUMMARY OF THE INVENTION

Accordingly the main object of the present invention is to provide a device for generating binary digit pseudo-random sequences, so designed as to give at the output thereof a multiplexed signal consisting of a pseudo-random sequence having a period $2^7-1$ even in the presence of tributary signals T1,T2,T3,T4 having simultaneously the logic level ∅, and the frame aligning word "11111∅1∅∅∅∅∅" in hard copy form.

According to one aspect of the present invention, this object is achieved by a device for generating pseudo-random sequences of binary digits, of the type comprising seven like logic sequential blocks synchronously driven by a predetermined frequency signal and each thereof assuming at the output the logic level of the related input depending on each pulse of said signal and assuming at said output a predetermined logic level as a predetermined logic level is present at an input thereof as supplied through a RESET line, the outputs of the first, second, third, fourth, fifth, sixth seventh blocks being respectively coupled to the inputs of the second, third, fourth, fifth, sixth, seventh blocks and the outputs of said sixth and seventh blocks being coupled to corresponding inputs of an Exxlusive-OR logic circuit the output thereof is coupled to the input of the first block; said device being associated with a logic apparatus coupling four discrete lines thereon a binary code information is transmitted having a frequency equal to the frequency of said signal with a line for transmitting binary code signals having a frequency which is four times said one frequency; said logic apparatus being of the type comprising: four twoinput AND logic circuits, the first inputs thereof are correspondingly coupled to said four lines and the second inputs thereof are derived from a line effective to supply the synchronization signal; four Exclusive-OR logic circuits, provided with at least two inputs each, and respectively a first, second, third and fourth Exclusive-OR circuits, the first inputs thereof being correspondingly coupled to the outputs of said AND circuits and the second inputs thereof being coupled to said device; a multiplexer provided with four inputs thereto there are correspondingly coupled the outputs of said first, second, third and fourth Exclusive-OR circuits and the output thereof is coupled to said transmission line; said device being characterized in that it comprises: a fifth Exclusive-OR logic circuit, provided with three inputs coupled to the outputs respectively of said first, fourth and sixth sequential blocks and the output thereof is coupled to the second input of said first Exclusive-OR circuit the input thereof is coupled to the output of said sixth sequential logic block and the output thereof is coupled to the second input of said second Exclusive-OR circuit; a seventh Exclusive-OR circuit provided with three inputs respectively coupled to the outputs of said second, fourth and fifth sequential blocks and the output thereof is coupled to the second input of said third Exclusive-OR logic circuit; an eighth Exclusive-OR logic circuit provided with two inputs coupled to the outputs respectively of said second and fifth sequential blocks and the output thereof is coupled to the second input of said fourth Exclusive-OR circuit; said device being further characterized in that said RESET line is coupled to a third input of said fourth Exclusive-OR circuit and being furthermore coupled to the SET inputs of said first, third, fourth, sixth and seventh sequential blocks as well as to the RESET inputs of the remaining said sequential blocks.

BRIEF DESCRIPTION OF THE DRAWINGS

Further characteristics of the present invention will become more apparent hereinafter from the following detailed description, with reference to the accompanying drawings, where:

FIG. 1 illustrates, in block form, a known device which has been briefly described hereinbefore for generating pseudo-random sequences of binary digits;

FIG. 2a illustrates, also in block form, a further known device, also briefly described above, for generating pseudo-random sequences and FIG. 2b illustrating the truth tables of the logic blocks and necessary for understanding the operation of the device illustrated in FIG. 2a;

FIG. 3 illustrates, in block form, the device according to the present invention; and FIG. 4 illustrates the truth tables for the most significative logic blocks of FIG. 3.

DESCRIPTION OF THE PREFERRED EMBODIMENT

Figure 2A:
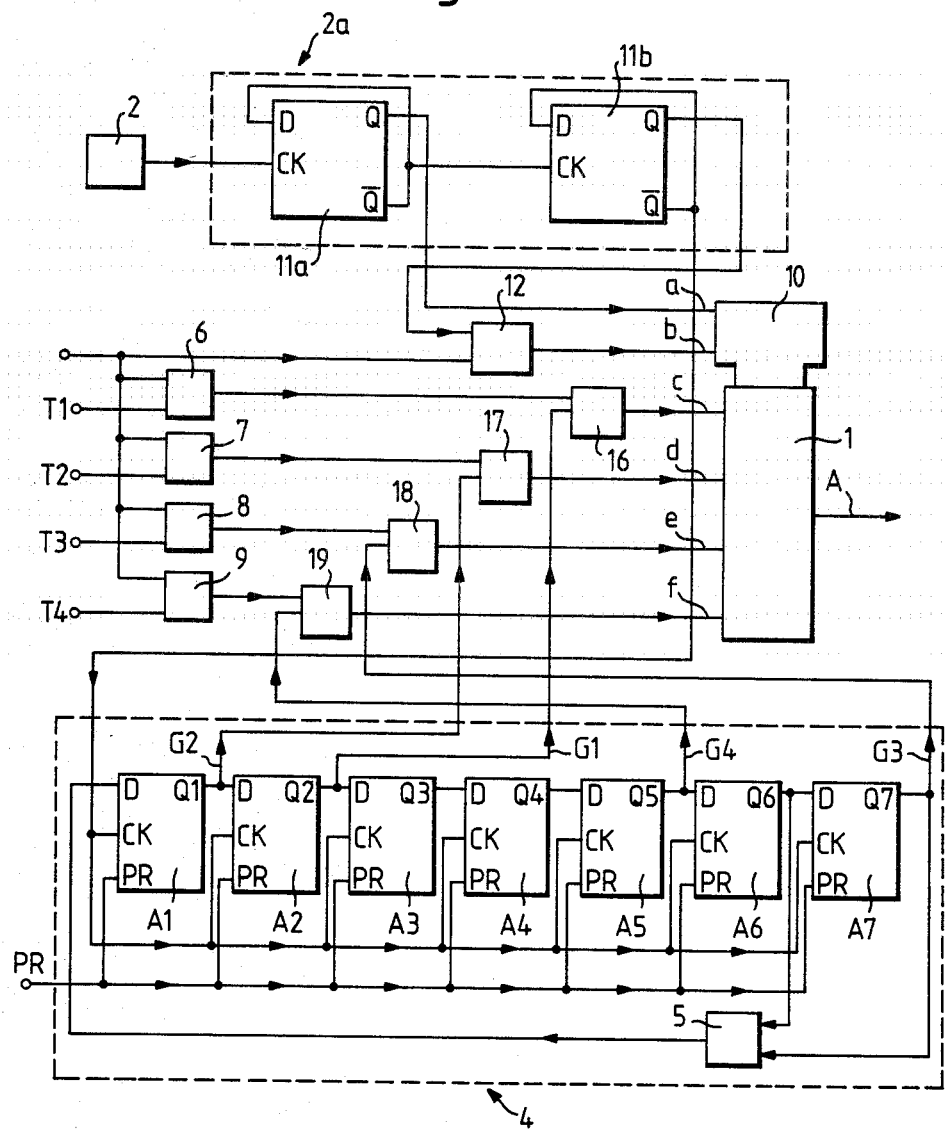

With reference to FIG. 3, it will be clearly apparent that the logic blocks indicated at 1,2,4 2a,1-1a,11b,10,6,7,8,9,16,17,18,19 are identical to the blocks indicated by those same reference numbers in FIG. 2a.

The PRESET line 30 (FIG. 3) is coupled to the SET inputs of the sequential blocks A1,A3,A4,A6,A7 and to the RESET inputs of the blocks A2,A5.

According to the present invention, between the Exclusive-OR circuits 16,17,18,19 (respectively the first, second, third and fourth Exclusive-OR circuits) and the source or generator 4, there are arranged four Esclusive-OR logic circuits 20,21 22,23 (respectively the fifth, sixth, seventh and eighth Exclusive-OR circuits), which are coupled as it is shown in FIG. 3 and as it will be herein further described.

The Exclusive-OR circuit 20 is provided with three inputs coupled to the outputs Q1,Q4,Q6 of the blocks A1,A4,A6 while the related output is coupled to the second input of the circuit 16 (the first input thereof is coupled to the output of the AND logic circuit 6).

The Exclusive-OR circuit 21 has the input thereof coupled to the output Q6 (block A6) while the related output is coupled to the second input of the circuit 17 (the first input thereof is coupled to the output of the AND logic circuit 7).

The Exclusive-OR circuit 22 is provided with three inputs respectively coupled to the outputs Q2,Q4,Q5 (blocks A2,A4,A5), while the corresponding output is coupled to the second input of the circuit 18 (the first input thereof is coupled to the output of the AND logic circuit 8).

The Exclusive-OR circuit 23 is provided with two inputs respectively coupled to the outputs Q5,Q2 (blocks A5,A2), the corresponding output being coupled to the third input of the circuit 19 (the first input thereof is coupled to the output of the AND logic circuit 9, and the second input thereof is coupled to the RESET line 30).

From an examination of the truth tables K1,K2,K3 (FIG. 4) respectively related to the sequential blocks A7 . . . A1, to the AND logic circuits and to the Exclusive-OR logic circuits or blocks, and from the examination of the particular mutual coupling of the mentioned logic blocks, it will be evident the mode of operation of the device according to the present invention, the truth table K4 thereof is illustrated in FIG. 4.

In the first column of said table 4 there is indicated the elementary clock time T scanned by the divider 2a (operating at about 141 MHz), in the second column there are indicated the logic levels S/R present on the RESET line 30, in the third column there is indicated the logic level of the synchronization signal S, in the fourth to tenth columns there are indicated the logic levels of the outputs Q7,6,1,4,3,2,1, in the eleventh to the fourteenth columns there are indicated the logic levels of the outputs P1,P2,P3,P4 respectively of the Exclusive-OR circuits 20,21,22,23, in the fifteenth to eighteenth columns there are indicated the logic levels of the inputs c,d,e,f of the multiplexer 1. At the time t=0 of the clock (first column, table K4)S=0 and S/R=0, the outputs P1,P2,P3,P4 are at a logic level 1, and there is set the zero time of the clock timing; in the mentioned situation the inputs c,d,e,f are all at a logic level 1.

More specifically, the particular coupling of the Exclusive-OR circuits 20,21,22,23 to the source 4, brings, at the time t=1 of the clock timing, with S=∅ and S/R=∅, the outputs P1,P2,P3,P4 respectively to the logic levels "1∅1∅", which logic levels are correspondingly present at the inputs c,d,e,f.

At the time t=2 of the clock timing (with S again equal to ∅), S/R is brought to the logic level 1; the particular coupling of the Exclusive-OR circuits 20,21,22,23 thereinabove mentioned to the source 4, brings the outputs P1,P2,P3,P4 respectively to the logic levels "∅∅∅1" while the inputs c,d,e,f are brought to the logic levels "∅∅∅∅": it should be noted that the fourth bit, at the input f, does not coincide with the logic level 1 of the output P4, since at the second input of the Exclusive-OR circuit 19 there is present the logic level 1 of the line 30.

The mentioned three sequences of four bits, comprise at the output A of the multiplexer 1 the frame aligning word which, as it is well known, is: "11111∅1∅∅∅∅∅".

The logic level S/R=1 at the time t=2 defines, at the time t=3 of the clock timing, a predetermined combination of the logic levels at the outputs Q7,6,5,4,3,2,1 (see the fourth rows of the table K4) which, synchronously with the fact that it is S/R=∅ and S=1, starts the scrambling operation on the signals T1,T2,T3,T4 (to this end see the inputs c,d,e,f from the fourth rows).

By resuming the technical approach according to the present invention (that is the provision of the Exclusive-OR circuits 20,21,22,23 and of the particular connection of the latter with the outputs of the sequential blocks A7 ... A1) affords the possibility of obtaining a multiplexed signal (at the output A of the multiplexer 1) having a frequency of about 565 MHz, comprising a pseudo-random sequence of period $2^7-1$ in the presence of T1=T2=T3=T4=∅.

Finally, the coupling of the RESET line 30 to an input of the Exclusive-OR circuit 19, as well as the particular coupling of that same line to the SET, RESET inputs of the sequential blocks A7 ... A1, permits to obtain the frame aligning word in a hard copy form.

It should be noted that the preceding description has been provided only by way of a not limitative example, thereby the thereinabove illustrated blocks or logic circuits may be replaced by corresponding ones effective to provide the same functions, without departing from the scope of the invention, as it is defined in the appended claims.

I claim:

1. A device for generating pseudorandom sequences of binary digits, of the type comprising seven like logic sequential blocks synchronously driven by a predetermined frequency signal and each thereof assuming at the output the logic level of the related input depending on each pulse of said signal and assuming at said output a predetermined logic level as a predetermined logic level is present at an input thereof as supplied through a RESET line, the outputs of the first, second, third, fourth, fifth, sixth blocks being respectively coupled to the inputs of the second, third, fourth, fifth, sixth, seventh blocks and the outputs of said sixth and seventh blocks being coupled to corresponding inputs of an Exclusive-OR logic circuit the output thereof is coupled to the input of the first block; said device being associated with a logic apparatus coupling four discrete lines thereon a binary code information is transmitted having a frequency equal to the frequency of said signal with a line for transmitting binary code signals having a frequency which is four times said one frequency; said logic apparatus being of the type comprising: four two-input AND logic circuits, the first inputs thereof are correspondingly coupled to said four lines and the second inputs thereof are derived from a line effective to supply the synchronization signal; four Exclusive-OR logic circuits, provided with at least two inputs, and respectively a first, second, third and fourth Exclusive-OR circuits, the first inputs thereof being correspondingly coupled to the outputs of said AND circuits and the second inputs thereof being coupled to said device; a multiplexer provided with four inputs thereto there are correspondingly coupled the outputs of said first, second, third and fourth Exclusive-OR circuits and the output thereof is coupled to said transmission line; said device being characterized in that it comprises: a fifth Exclusive-OR logic circuit (20), provided with three inputs coupled to the outputs Q1,Q4,Q6 respectively of said first, fourth and sixth sequential blocks A1,A4,A6 and the output thereof is coupled to the second input of said first Exclusive-OR circuit (21) the input thereof is coupled to the output Q6 of said sixth sequential logic block A6 and the output thereof is coupled to the second input of said second Exclusive-OR circuit (17); a seventh Exclusive-OR logic circuit (22) provided with three inputs respectively coupled to the outputs Q2,Q4,Q5 of said second, fourth and fifth sequential blocks A2,A4,A5 and the output thereof is coupled to the second input of said third Exclusive-OR logic circuit (18); an eighth Exclusive-OR logic circuit (23) provided with two inputs coupled to the outputs Q2,Q5 respectively of said second and fifth sequential blocks A2,A5 and the output thereof is coupled to the second input of said fourth Esclusive-OR circuit (19); said device being further characterized in that said RESET line (30) is coupled to a third input of said fourth Exclusive-OR circuit (19) and being furthermore coupled to the SET inputs of said first, third, fourth, sixth and seventh sequential blocks A1,A3,A4,A6,A7 as well as to the RESET inputs of the remaining said sequential blocks A2,A5.

* * * * *